United States Patent [19]
Griffiths et al.

[11] 3,974,524

[45] Aug. 10, 1976

[54] MAGNETIC STORAGE APPARATUS EMPLOYING FLEXIBLE RECORD DISKS WITH PERIPHERAL DISK-IDENTIFICATION MEANS

[75] Inventors: Donald E. Griffiths, Boulder County; Carl F. Pugliese, Adams County, both of Colo.

[73] Assignee: International Business Machines Corporation, Armonk, N.Y.

[22] Filed: Apr. 14, 1975

[21] Appl. No.: 568,075

[52] U.S. Cl. ................................. 360/75; 360/98; 360/99
[51] Int. Cl.² ................. G11B 21/02; G11B 5/012; G11B 5/016
[58] Field of Search ................. 360/98, 99, 72, 75, 360/77, 78

[56] References Cited

UNITED STATES PATENTS 3,838,462  9/1974  Barbeau et al. ..................... 360/99

*Primary Examiner*—Robert S. Tupper
*Attorney, Agent, or Firm*—Herbert F. Somermeyer

[57] ABSTRACT

A stack of flexible record disks is peripherally accessed following a peripheral identification procedure. A magnetic sensing means disposed in close proximity to the outer circumference of the stack senses a magnetic record track on the respective disk for identifying axial position such that the record surface of a predetermined disk can be accessed. For example, one of a plurality of frequencies particularly identify a disk within a group of disks. A given storage apparatus may have a plurality of such groups.

9 Claims, 3 Drawing Figures

MAGNETIC STORAGE APPARATUS EMPLOYING FLEXIBLE RECORD DISKS WITH PERIPHERAL DISK-IDENTIFICATION MEANS

DOCUMENTS INCORPORATED BY REFERENCE

1. Documents showing structure of magnetic sensing means;
   U.S. Pats. Hardart et al., No. 3,611,557 and Morrison et al., No. 3,479,663, show preferred head constructions of laminated metal heads usable with the present invention.
   U.S. Pat. No. 3,217,305 shows a ferrite head suitable for use in the illustrated sensing means.
   U.S. Pat. No. 3,813,692 shows a magneto resistive head suitable for use with the present invention.
2. Documents showing structure for coarse positioning sensing means;
   U.S. Pat. Forrester et al., No. 3,069,608, shows a numerically controlled positioning system of a type usable with the present invention.
   U.S. Pats. Morin et al., No. 3,020,460, and U.S. Patent Kelling No. 3,248,622, shows a coarse-fine positioning system.
   U.S. Pats. Butterman No. 3,130,393, Bowdle, 3,158,844, and Dickinson, 2,994,856, all show axial positioning apparatus for record storage apparatus.
   U.S. Pat. McIntash et al., No. 3,924,268, shows a "piggy back" positioner for coarse-fine positioning.

BACKGROUND OF THE INVENTION

The present invention relates to magnetic storage apparatus, particularly of the mass store type employing a plurality of flexible record disks and particularly to means for identifying which disk is in juxtaposition for transducing access.

rotating disk type electronic memories have been used for the last several years. While most of these memories have employed the so-called rigid record disk, later developments have shown that the utilization of flexible record disks may provide increases in volumetric efficiency; that is, more recording can be achieved in less volume when apparatus employs flexible record disks than when employing rigid record disks. Such flexible record disks are employed in a coaxial stack of such disks having a spacing less than that required for transducing access. Apparatus is employed for splitting the stack, that is, partially axially separating a selected two of the flexible disks to provide a transducing access opening. An example of such apparatus, no limitation thereto intended, is shown by Barbeau et al., in U.S. Pat. No. 3,852,820.

One of the problems of peripherally accessing a stack of flexible record disks is caused by the dynamics of the disk rotation, particularly the changes of axial position of the disk edge with rotation such as caused by flutter, wow, and changes in fluid dynamics within the stack of disks called "stack breathing." Additionally, eccentricities and individual disk dynamics combined with the close spacing of the disks create problems in precisely identifying the disk to be selected Accordingly, a precise peripheral disk locator for selected. accurate record surface accessing is desired for improving throughput, that is, reducing the number of unsuccessful recording accesses into a stack of flexible record disks.

SUMMARY OF THE INVENTION

It is an object of the present invention to provide a facile, low-cost, and effective peripheral disk identifier suitable for a stack of flexible record disks which are rotating in unison.

In accordance with one aspect of the invention, a low-density signal is recorded at the outer peripheral edge of each recording surface, i.e., at a maximum diameter. This signal may be a constant frequency signal or may contain coded information. Magnetic sensing means are disposed in peripheral adjacency to a stack of disks and are axially movable for sensing the signals recorded at the outer edge of each of the disks. The magnetic sensing means may include one or more transducing gaps which may be phased or otherwise interrelated for determining direction and accurate location of any given disk edge, or for reading the coded information for identifying the axial position of the disk. In one embodiment, a single frequency is recorded in each of the disks. The disks in each stack are arranged into groups or bands with each disk within a given band having its own unique frequency for identification.

The foregoing and other objects, features, and advantages of the invention will become apparent from the following more particular description of the invention, as illustrated in the accompanying drawing.

The Drawing

DETAILED DESCRIPTION

Figure 2:
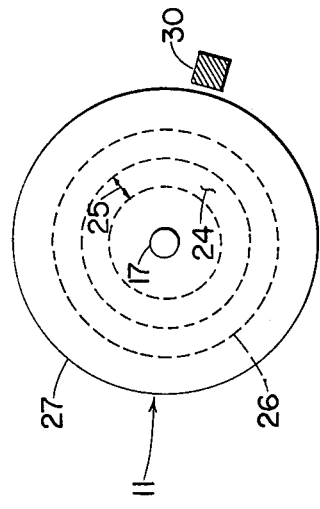
FIG. 2 is a diagrammatic showing of a single record disk from the FIG. 1 illustrated apparatus and showing the location of the data tracks, the disk identification track, and edge sensing apparatus.
Figure 1:
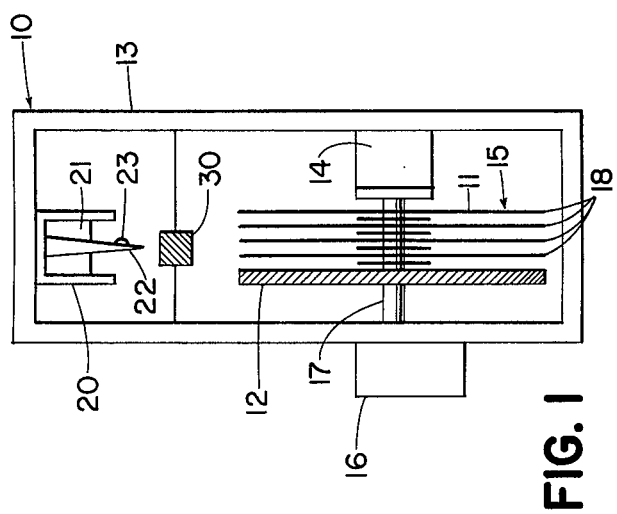
FIG. 1 is a diagrammatic showing of a record storage apparatus with which the present invention may be advantageously employed.

Data storage apparatus 10 includes a coaxial stack of flexible record disks 11 having a stabilizing plate 12 and mounted for rotation on frame 13. Motor 14 rotates the stack 15 of disks 11 at a constant angular speed. An air supply 16 supplies stabilizing air through tubular spindle 17 for radial outward flow between the disks 11, which further tends to stabilize the outer edges 18 of disks 11. See U.S. Pat. No. 3,867,723 for construction of such an apparatus.

Peripheral access to a record surface on the disks 11 is achieved by an axial movable carriage 20 mounted on the upper side of frame 13. Carriage 20 carries a radially movable carriage 21 having a disk separator 22 which integrally mounts a transducing head 23. Separator 22 partially axially separates two adjacent disks 11 for providing transducing access to a record surface thereon by transducer 23.

In accordance with the present invention, the axial position of carriage 20 and, hence, splitter 22, is enhanced by providing a disk identification recording in one track along the outer periphery of each disk 11. Referring now to FIG. 2, record disk 11, record surface 24, consists of a magnetic coating for receiving data signals in a radially extending area 25. Additionally a disk identification track 26 is located at the outer peripheral edge 27 of each disk 11. The signals in track 26 are recorded on the magnetic coating and are designed to identify the disk 11 using magnetic sensing means 30.

In one embodiment of the invention, coded signals are recorded in each of the identification tracks, the coding representing an axial address of the disk; hence, by sensing the recording in disk identification track 26, each disk is uniquely identified. In another embodiment, as particularly shown in FIG. 3, the stacks of disks are divided into bands of disks; for example, each band having five disks. The size of the band is selected such that the band can be identified using known axial positioning techniques. Each disk within a band of disks is then identified by a unique frequency recorded in the corresponding disk identification tracks 26. It is preferred that the frequency relationships within each band are nonharmonic such that second, third, fourth, etc., harmonics do not cause ambiguities in disk identification. Further, it is preferred that a magnetic sensing means 30 suitably mounted on a carriage 31 for axial movement along the stack of disks 15 identifies the axial position by sensing the frequencies F1-F5 for each band of record disks 11. Carriages 31 and 20 may be the same or may be separate and synchronously actuated. The radial spacing 32 of magnetic sensing means 30 from the outer edges 27 of record disk 11 may be in the order of 0.001 to 0.035 inch, no limitation thereto intended. With such a range of spacing between magnetic sensing means 30 and the edge 27 of the disk, this yields a track 26 to sensing means 30 spacing of up to 0.200 inch. It is desired for maximum signals from magnetic sensing means 30 that longer wavelengths be employed in recording identification indicia in track 26. For example, typical wavelengths in a tested embodiment of the present invention included 0.028 inch, 0.056 inch, 0.112 inch, and 0.280 inch. The amplitude at the lower wavelength, 0.280 inch (2 kilohertz) was higher than at the shorter wavelengths. However, the ratio of peak amplitude to average amplitude was greater at the shorter wavelengths of 0.028 inch or 20 kilohertz. The gap spacing 32 should always be different than the recorded wavelength. If the spacing and the wavelength are identical, then the output of magnetic sensing means 30 approaches zero. It is preferred that the wavelength recorded in track 26 always be greater than the spacing 32. In some applications where the flutter or axial perturbations of the disk edges 27 is at a high frequency, then the higher frequency (shorter wavelengths) recordings in track 26 are necessary. In a five-frequency band, the frequencies which may be used for practicing the present invention are:

11.2 KHz
10.6 KHz
10.0 KHz
9.4 KHz
8.8 KHz

Magnetic sensing means 30 preferably consists of a pair of magnetic transducers 35, 36 which are axially spaced apart more or less than the nominal spacing between two of the adjacent disks 11. Each transducer 35, 36 has a transducing gap 37, 38 disposed perpendicular to the planar extent of the record disks 11. When gaps 37 and 38 are bracketing a selected disk, such as disk 11A having frequency F3, a minimum differential signal travels across the leads 40 and 41 to detection apparatus, to be described.

Figure 3:
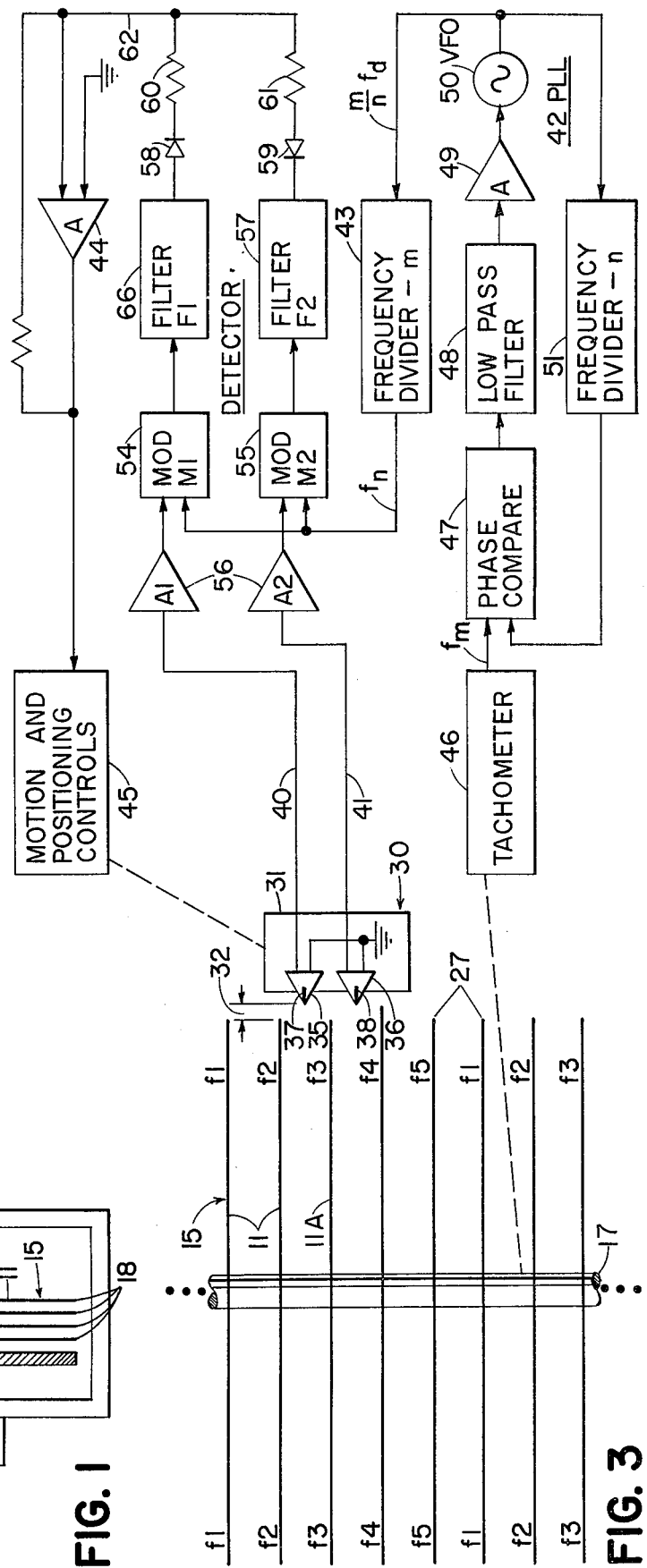
FIG. 3 is a combined schematic and diagrammatic showing of apparatus employing the present invention.

The detector in FIG. 3 is a differentially connected superheterodyned detector responsive to the frequencies F1-F5 as determined by a phase-lock loop 42 and adjusted for the five frequencies by a frequency divider 43 to supply a position indicating signal through isolating amplifier 44 to motion and positioning control circuits 45. When heads 37 and 38 bracket the desired disk 11A, output on line 62 is nulled. Off-center toward F2 results in a positive signal, and a negative signal indicates off-center toward F4.

Circuits 45 can be of the usual positioning servo type and are not further described for that reason. Control circuits 45 have a mechanical connection to carriage 31 and are suitably mounted on frame 13 for positioning carriage 31 axially of stack 15. A tachometer 46 operatively connected to tubular spindle 17 indicates speed of rotation of stack 15. Tachometer 46 supplies its signal $f_m$ to phase compare circuit 47 through low-pass filter 48, thence, amplifier 49 to VCO (variable frequency oscillator) 50. The VCO output signal is supplied through frequency divider 51 to phase compare 47 to complete the phase-lock loop 42 which operates in a known manner. By adjusting frequency divider 51 and frequency divider 43 to ratio m/n, the appropriate frequency F1-F5 is selected. VCO 50 has a frequency $f_V$. In any event, the reference frequency $f_n$, which in the illustrated positioning of carriage 31 equals $f_3$, is supplied to two separate superheterodyned modulation circuits 54 and 55, which also receive signals through a pair of amplifiers 56 from leads 40 and 41, respectively. The demodulated signals are supplied through intermediate frequency filters 66 and 57 tuned to the superheterodyned intermediate frequency. A pair of diode detectors 58 and 59 are oppositely poled and connected through a pair of current summing resistors 60 and 61 to a current summing node 62, which supplies its signal through amplifier 44 to control circuits 45. When sensing means 30 is symmetrically disposed with respect to disk 11A outer edge 27, the minimum amplitude signal is supplied to positioning controls 45 which position carriage 31 to a null condition.

To select a band of disks, each frequency F1 may be detected in each band. Counting the number of F1 disks detected indicates the axial position of sensing means 30. Upon reaching a desired band, the individual disk is selected as stated above. Each disk may also have a unique combination of recorded frequencies. The two head structure of means 30 is replaceable by and equivalent to a single gap head using a center-tapped read winding.

While the invention has been particularly shown and described with reference to a preferred embodiment thereof, it will be understood by those skilled in the art that various changes in form and detail may be made therein without departing from the spirit and scope of the invention.

What is claimed is:

1. A flexible record disk type record apparatus having a coaxial stack of commonly rotatable flexible record disks, the improvement including in combination:
a track having given recorded disk identifying magnetically sensible signals including a recorded given wavelength component on each of said disks in immediate juxtaposition to the outer peripheral edge thereof; and
a magnetic sensing apparatus disposed in immediate proximity of and spaced radially outwardly a distance other than said given recorded wavelength of said given wavelength component in said track, from the outer periphery of said disks and having a transducing gap facing said edge for sensing said given recorded disk identifying signals for identifying axial position of the magnetic sensing apparatus.

2. The subject matter set forth in claim 1 further including in combination:
a plurality of said disks forming a band with a plurality of bands in the stack; and
each disk in each band having a unique given one of said given recorded disk identifying signals whereby each disk in each band can be uniquely identified by sensing said unique given one recorded disk identifying signal in respective ones of said tracks.

3. The subject matter set forth in claim 1 wherein unique one of said given recorded disk identifying signals in each said disk in a band of disks has a unique predetermined frequency component.

4. The subject matter set forth in claim 1 wherein said magnetic sensing apparatus includes circuit means for supplying a differential signal indicating relative axial position to a given disk with a null differential amplitude when in a predetermined axial position to said given disk.

5. The subject matter set forth in claim 1 wherein said magnetic sensing apparatus includes two axially spaced-apart transducing gaps.

6. The subject matter set forth in claim 5 wherein said gaps lie in a plane substantially perpendicular to the plane of said record disks.

7. The subject matter set forth in claim 5 wherein the axial spacing between said two sensing gaps is less than the nominal axial spacing between two adjacent ones of said record disks.

8. A magnetic recording storage device having a stack of a plurality of coaxial flexible record disks mounted on a spindle for rotation therewith about an axis of rotation means for accessing a record surface from the outer periphery of said stack of record disks and being axially movable along the axis of said stack of disks at the outer periphery thereof,
the improvement including in combination:
means axially movable along the outer periphery of said stack of disks and being spaced radially outwardly therefrom a predetermined distance and including magnetic sensing means including a sensing portion facing said stack transversely to said axis of rotation for sensing magnetization along the outer periphery of said record disks, said predetermined distance being such that the spacing between peripheral edges of said flexible record storage disks and said magnetic sensing means is a first distance;
each of said record disks having a peripheral record track in juxtaposition to said peripheral edge and with an identifying magnetically sensible signal therein which is sensible by said magnetic sensing means and including signals having wavelengths other than said first distance;
a plurality of said record disks having a unique signal component recorded in said peripheral second tracks, respectively for identifying the respective disks; and
said magnetic sensing means having means capable of identifying said disks whereby said disks are uniquely identified from outside the outer periphery of said stack.

9. The subject matter set forth in claim 8 wherein said magnetic sensing means includes a pair of transducing gaps being axially spaced apart; and
a given disk identifying wavelength on said record disk's outer track being greater than said first distance.

* * * * *